(12) United States Patent
Ishizuka

(10) Patent No.: US 7,782,491 B2
(45) Date of Patent: Aug. 24, 2010

(54) IMAGE FORMING APPARATUS

(75) Inventor: Hisashi Ishizuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1010 days.

(21) Appl. No.: 10/932,990

(22) Filed: Sep. 2, 2004

(65) Prior Publication Data

US 2005/0052702 A1 Mar. 10, 2005

(30) Foreign Application Priority Data

Sep. 4, 2003 (JP) ............... 2003-312211

(51) Int. Cl.
*G06K 15/00* (2006.01)
*G06K 9/34* (2006.01)
*H04N 1/46* (2006.01)

(52) U.S. Cl. .................. 358/2.1; 358/1.9; 358/540; 358/518; 382/163; 382/173; 382/176

(58) Field of Classification Search ........... 358/2.1, 358/1.9, 3.24, 504, 518; 382/173, 176
See application file for complete search history.

(56) References Cited

U.S. PATENT DOCUMENTS

| | | | | |
|---|---|---|---|---|
| 4,690,542 | A | * | 9/1987 | Furuta et al. ............ 399/179 |
| 5,668,636 | A | * | 9/1997 | Beach et al. ............ 358/296 |
| 7,085,006 | B2 | * | 8/2006 | Yokoyama et al. ......... 358/1.9 |
| 2002/0097436 | A1 | * | 7/2002 | Yokoyama et al. ......... 358/2.1 |

FOREIGN PATENT DOCUMENTS

JP 10-289079 A 10/1998

* cited by examiner

*Primary Examiner*—King Y Poon
*Assistant Examiner*—Lawrence E Wills
(74) *Attorney, Agent, or Firm*—Panitch Schwarze Belisario & Nadel LLP

(57) ABSTRACT

In a color pair selecting section, a color pair which is used for 2-color printing is selectively inputted from a plurality of colors. In a print data separating section, print data is separated into data in different printing forms. In a print data developing section, one of the data in the different printing forms is color converted and developed by using one of the color pair and the other data in the different printing forms is color converted and developed by using the other one of the color pair. In an image drum up/down section, image drums to form images by colors other than the color pair are discriminated and held inoperative. Deterioration of expressing ability in the 2-color printing is prevented and a decrease in lives of the image drums which are not used is prevented.

11 Claims, 16 Drawing Sheets

Fig. 3

PRINT

PRINTER

PRINTER NAME: XXXXXXXXX ▶ — 27

STATUS
KIND
LOCATION
COMMENTS

30 — PROPERTY

☐ OUTPUT TO FILE

THE NUMBER OF PRINTS

THE NUMBER OF COPIES — 28 ◀▶

ENLARGEMENT/REDUCTION

THE NUMBER OF PAGES PER SHEET — 25 ▶

DESIGNATION OF SHEET SIZE — 26 ▶

PRINT RANGE
◉ ALL
○ PRESENT PAGE
○ PAGE DESIGNATION

29
PRINT TARGET: SENTENCE ▶
PRINT DESIGNATION: ALL ▶

OPTION

OK — 24

CANCEL

Fig.7
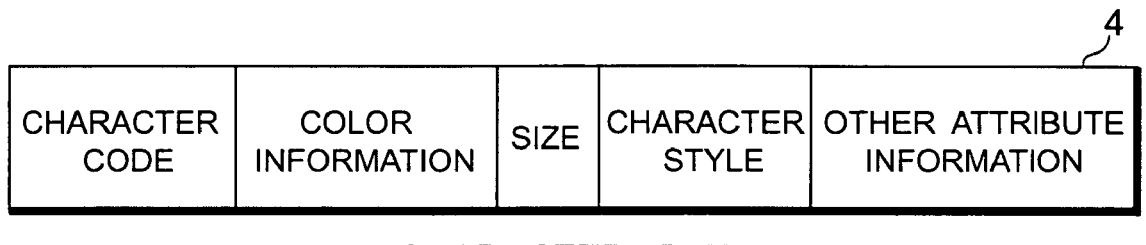
CHARACTER DATA
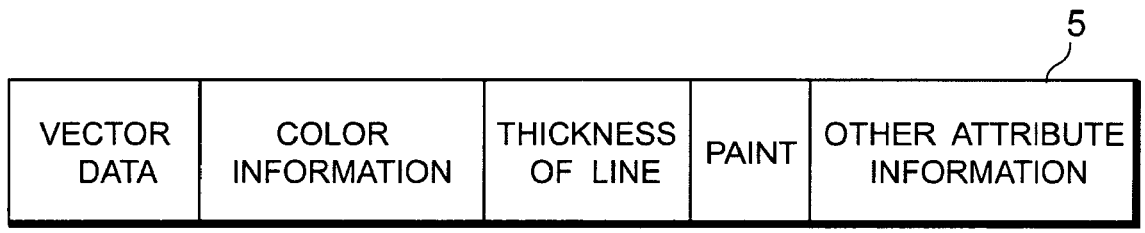
FIGURE DATA
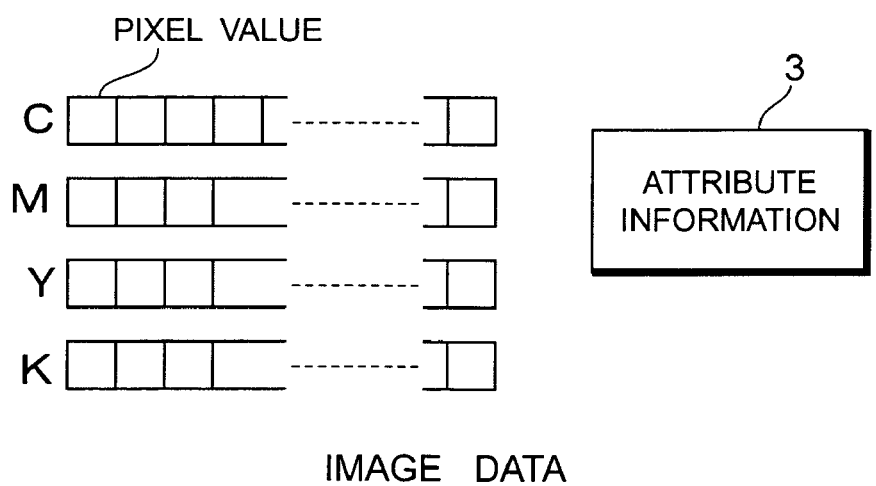
IMAGE DATA

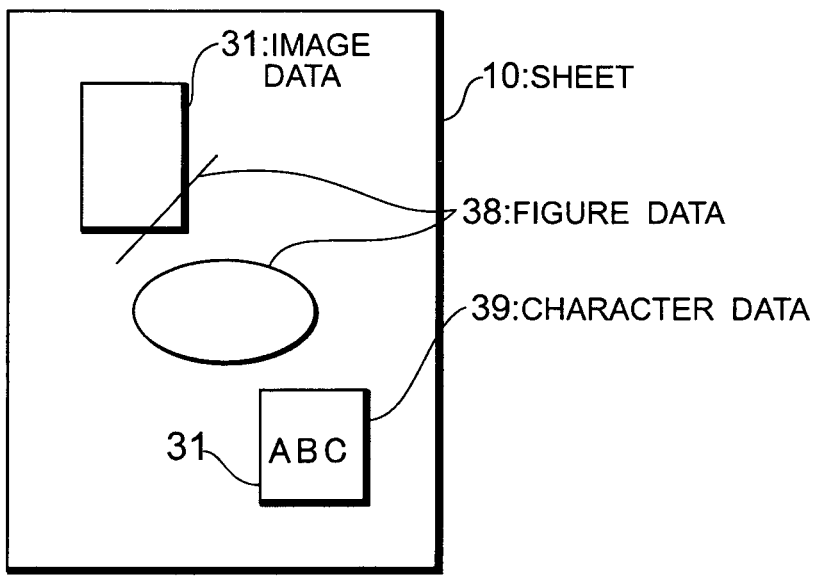
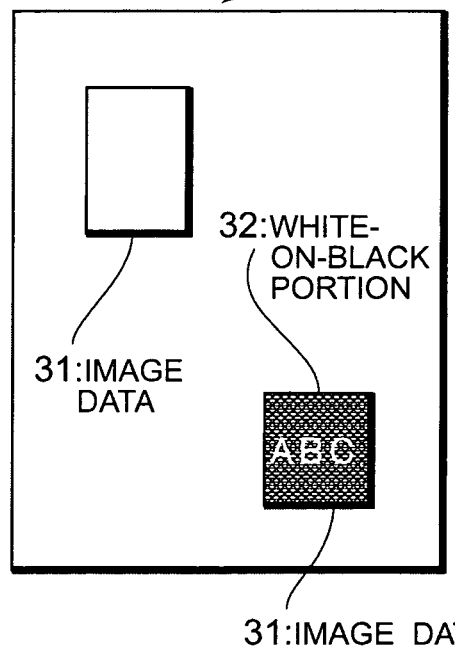
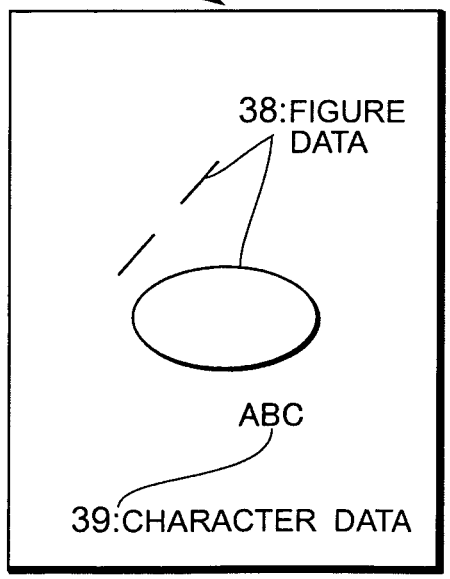

IMAGE FORMING APPARATUS

BACKGROUND OF THE INVENTION

1. Field of the Invention

The invention relates to an image forming apparatus such as a color printer or the like.

2. Related Background Art

In an image forming apparatus such as an electrophotographic printer or the like, image information sent from an upper apparatus is converted into print data. In the image forming apparatus, a photosensitive drum is charged to a negative polarity by a charging roller and an electrostatic latent image of the print data is formed by an LED head. A toner image is formed onto the electrostatic latent image by using a developing roller, a toner conveying roller, a developing blade, and the like. The toner image is transferred onto a print sheet by a transfer apparatus. Toner remaining on the photosensitive drum in those steps is removed by a cleaning apparatus.

In a color electrophotographic printer or the like, a black image drum, a yellow image drum, a magenta image drum, and a cyan image drum are provided in correspondence to colors of K (black), Y (yellow), M (magenta), and C (cyan), respectively. Those four image drums are attached to predetermined positions in the image forming apparatus. The print data of a predetermined color is transmitted to each of the four image drums. The four image drums reproduce images based on the respective print data onto the print sheet. A color image is reproduced in this manner. In such a conventional color electrophotographic printer or the like, a technique for separating the print data into image data, figure data, and character data and effectively reproducing a monochromatic image or the like and the like have already been opened (for example, refer to an abstract of JP-A-10-289079).

In the above conventional color electrophotographic printer or the like, in the case of receiving color image information and printing a color image only in two colors, a data process for preventing a deterioration of expressing ability is necessary. Even in the case of reproducing the image in two colors, in order to execute the printing operation, all of the four image drums for the colors of Y, M, C, and K need to be attached to the predetermined positions in the image forming apparatus. Therefore, since the image drums which are not used for the 2-color printing are also held in the operative mode, their lives are shortened. Further, those predetermined positions are preset positions and cannot be changed. Thus, such a problem to be solved that in the case where a part of the character data is emphasized by using another color or the like, even when another color is not limited to a certain color, it is difficult to continue the printing of only two colors for a long time still remains.

SUMMARY OF THE INVENTION

It is an object of the invention to provide an image forming apparatus such as a color printer or the like which can solve such a problem that in the case of receiving color image information and printing a color image only in two colors, a data process for preventing a deterioration of expressing ability is necessary and it is difficult to continue the printing of only two colors for a long time.

According to the present invention, there is provided an image forming apparatus of forming an image in a plurality of different colors on the basis of print data, comprising:

a print data separating section wherein the print data is separated into data in different printing forms; and a print data developing section wherein one of the data in the different printing forms is color converted by using one of the plurality of colors and developed and the other one of the data in the different printing forms is color converted by using the other one of the plurality of colors and developed.

In the image forming apparatus, one of the plurality of colors is black, and in the print data developing section, image data is converted into a gray scale by using black and the data in the different forms other than the image data is color converted by using the other one of the plurality of colors.

The image forming apparatus may further comprise a color information obtaining section wherein color information showing the colors which image drums attached in predetermined positions have is obtained; and a data distribution setting section wherein a distributing rule for distributing the data in the different forms on the basis of the color information is set.

According to the present invention, there is provided an image forming apparatus for forming an image onto a medium, comprising:

a receiving unit which receives multicolor print data, wherein a first image of a single color is formed from data in a first printing form in the received print data and a second image of at least two colors is formed from data in a second printing form different from the first printing form.

The image forming apparatus may further comprise an image data discriminating unit which discriminates image data in the first printing form from the received print data; and a first image forming unit which forms an image of a single color from the image data discriminated by the image data discriminating unit.

The image forming apparatus may further comprise a character data discriminating unit which discriminates character data in the second printing form from the received print data; and a second image forming unit which forms a character image of two colors from the character data discriminated by the character data discriminating unit.

The apparatus according may further comprise a figure data discriminating unit which discriminates figure data in the second printing form from the received print data; and a third image forming unit which forms a figure image of two colors from the figure data discriminated by the figure data discriminating unit.

The deterioration of the expressing ability in the 2-color printing is prevented, by providing: the color pair selecting step wherein a reproduction color pair which is used for the 2-color printing is selected from a plurality of color pairs which have previously been selected; the print data separating step wherein the print data is separated every different kind of data included in the print data; and the print data developing step wherein one of the different kinds of data is color converted by using one of the reproduction color pair and developed and the remaining ones of the different kinds of data is color converted by using the other one of the reproduction color pair and developed. There is also provided the image drum up/down step wherein the image drums having the colors other than the reproduction color pair are selected and held in the inoperative mode. Thus, since the drum surfaces of the image drums which are not used are held in the contactless (removing) state where they are not come into contact with the sheet, a decrease in drum lives due to the friction does not occur.

By further providing a color information obtaining step wherein color information showing the colors held by the image drums attached in predetermined positions is obtained and a data distribution setting step wherein a distributing rule for distributing the data on the basis of the color information is set, even if the predetermined image drums are not attached in the predetermined positions of the image forming apparatus, only the 2-color printing can be executed for a long time.

The above and other objects and features of the present invention will become apparent from the following detailed description and the appended claims with reference to the accompanying drawings.

BRIEF DESCRIPTION OF THE DRAWINGS

FIG. 3 is an explanatory diagram (part 1) of a guide display screen;

FIG. 7 is an explanatory diagram of kinds of data;

FIG. 8 is an explanatory diagram of separation of the data;

DETAILED DESCRIPTION OF THE PREFERRED EMBODIMENT

According to the invention, the user is allowed to select a reproduction color pair which is used for the 2-color printing from a plurality of color pairs which have previously been selected. Print data is separated into different kinds of data included in the print data, for example, image data, figure data, character data, and the like. The image data is color converted into a gray scale by using one (normally black) of the reproduction color pair and developed. The remaining ones of the different kinds of data, that is, the figure data and the character data are color converted by using the other one of the reproduction color pair and developed. By this method, the deterioration of the expressing ability in the printing of two colors is prevented. Further, the image drums having the colors other than the reproduction color pair are selected and held in the inoperative mode. Thus, the reduction in lives of the image drums of the colors which are not used in the 2-color printing can be prevented. An embodiment of the invention will now be described hereinbelow with reference to the drawings.

Embodiment

Figure 1:
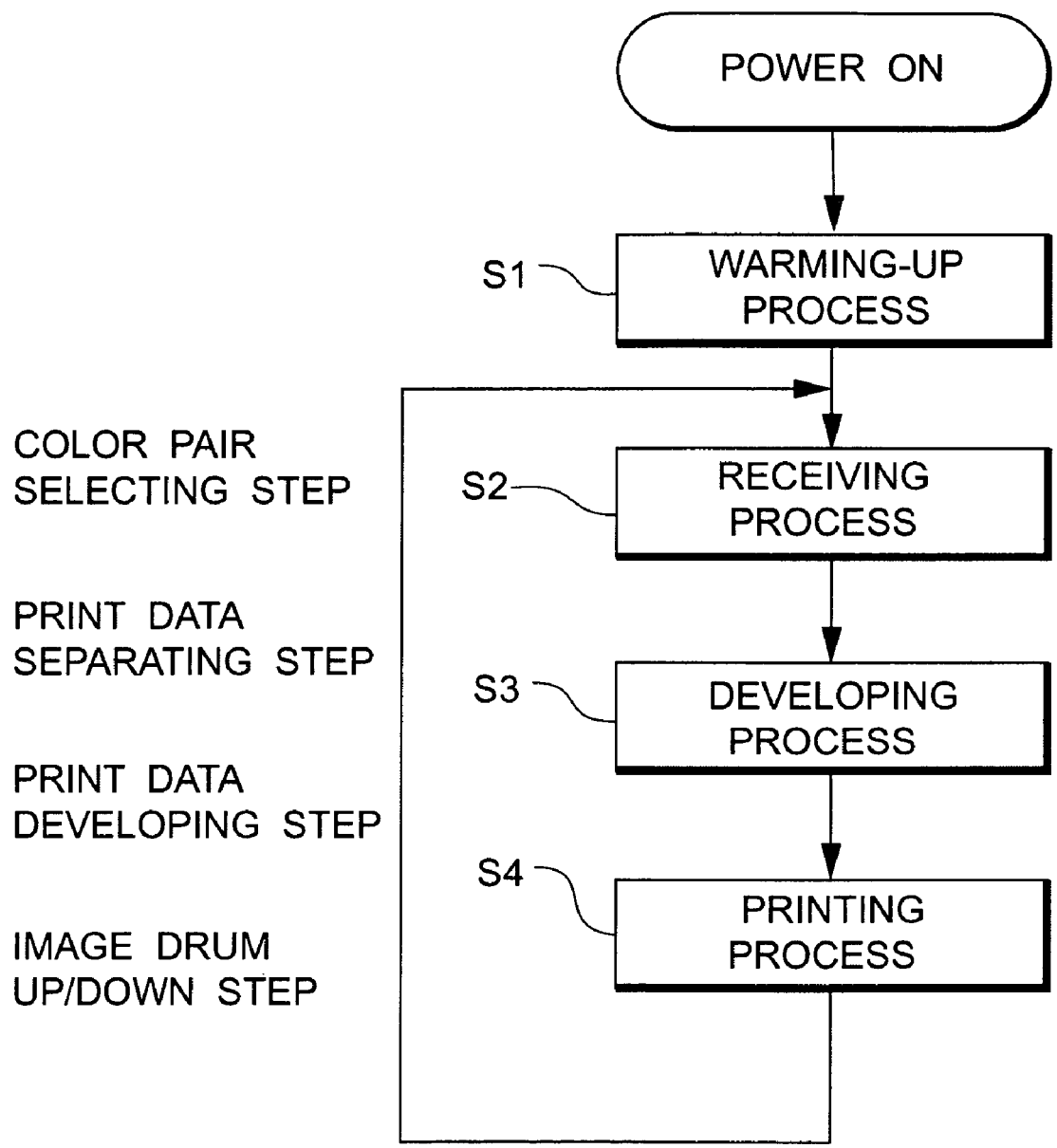
FIG. 1 is a flowchart for the fundamental operation in an embodiment.

FIG. 1 is a flowchart for the fundamental operation in the embodiment.

As shown in the diagram, an image forming method of the embodiment includes four steps S1 to S4. Prior to explaining the details of these four steps, a color printer is mentioned as an example to which the image forming method is applied and an outline of portions which are necessary for explanation of the invention will be described with reference to other drawings.

Figure 2:
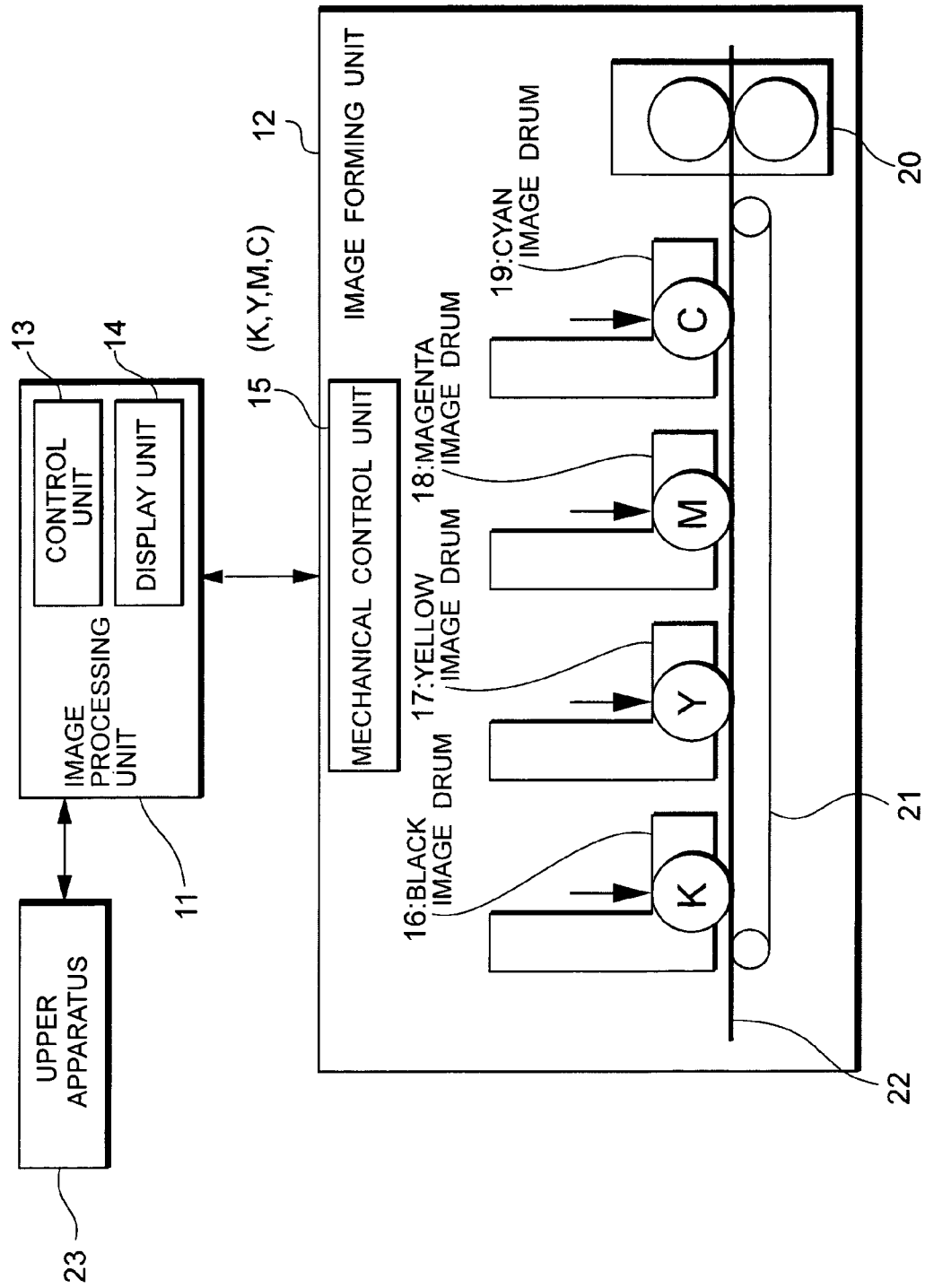
FIG. 2 is an explanatory diagram of an image forming apparatus.

FIG. 2 is an explanatory diagram of an image forming apparatus.

Referring to the diagram, the color printer as an example of the image forming apparatus to which the image forming method of the invention is applied comprises an image processing unit 11 and an image forming unit 12.

The image processing unit 11 is a portion for receiving image information from an upper apparatus 23, forming print data, and sending it to the image forming unit 12. A control unit 13 and a display unit 14 are provided in the image processing unit 11.

The control unit 13 is a portion for converting the image information received from the upper apparatus 23 into the print data. As will be explained in detail hereinafter, the control unit 13 is a portion for separating the print data into different kinds of data such as image data, character data, figure data, and the like. Further, the control unit 13 is also a microprocessor for controlling the whole apparatus. The display unit 14 is a portion for displaying and guiding predetermined items onto a display so as to allow the user to select various conditions such as printing conditions and the like. An example of a guide display according to the image forming method of the invention will now be described with reference to FIG. 3.

FIG. 3 is an explanatory diagram (part 1) of a guide display screen.

As shown in the diagram, the user is required to input general items regarding a printing process. That is, it is necessary to input: a printer name 27 (a name of a printer which is at present connected to the apparatus); the number of prints 28; a print target 29; the number of pages per sheet (25); designation of a sheet size (26); and the like. When the user clicks an OK button 24 after those items are inputted, data of application software is converted into a printer language and sent to a mechanical control unit 15 of the image forming unit 12. Subsequently, when the user clicks a property button 30, detailed setting regarding the image forming method of the invention is required.

Figure 4:
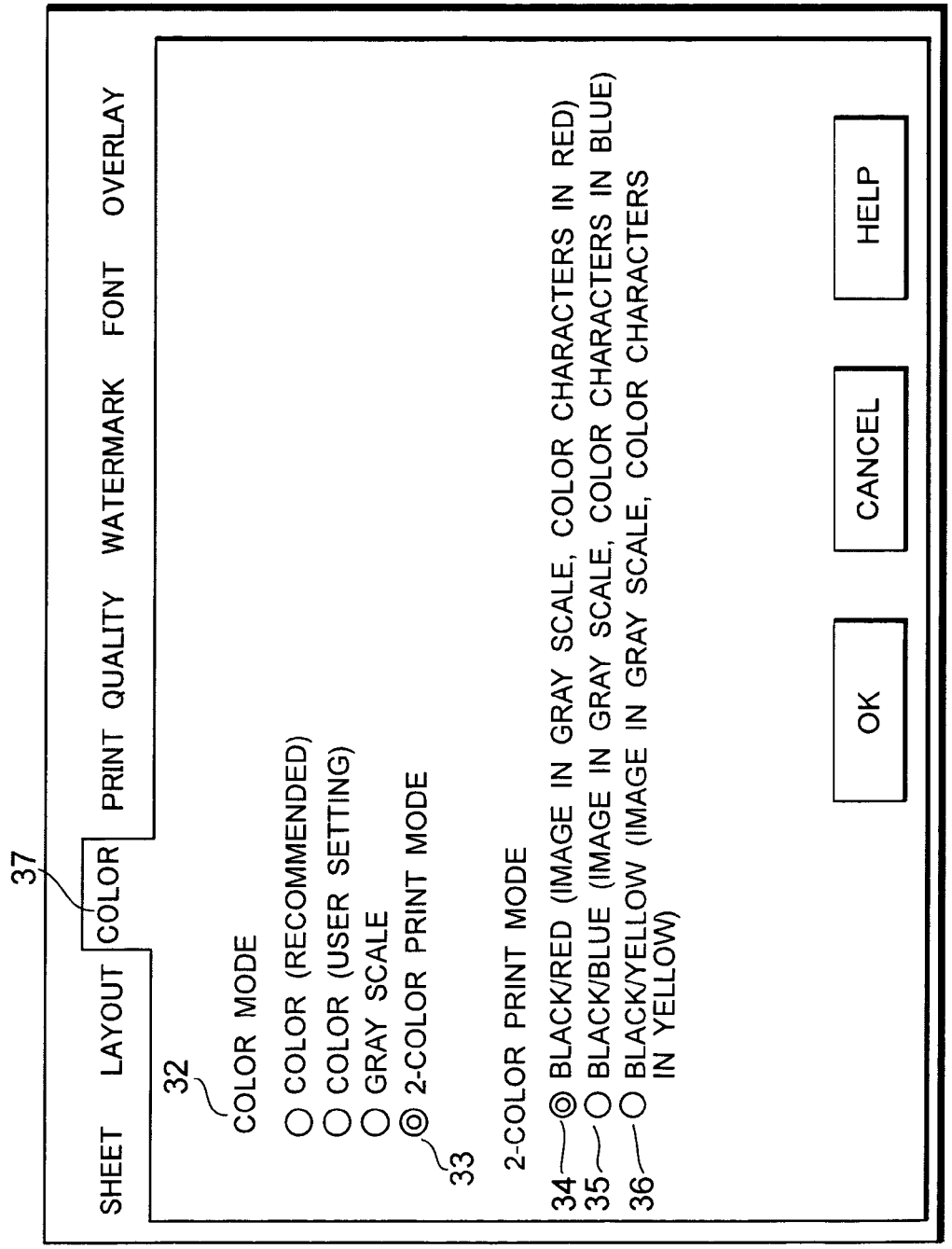
FIG. 4 is an explanatory diagram (part 2) of the guide display screen.

FIG. 4 is an explanatory diagram (part 2) of the guide display screen.

When the user clicks a desired one of the items such as sheet, layout, color, print quality, watermark, font, and overlay displayed in a top portion of the diagram by using a mouse, the display screen is shifted to detailed setting of the selected item. Only a case where a color 37 which is directly concerned with the invention is clicked with the mouse will now be described. When the color is selected, a 2-color print mode 33 is displayed as one of items of a color mode. By clicking it with the mouse, the 2-color print mode is validated (o is switched to Ø). Details of the 2-color print mode are shown under the 2-color print mode 33. The user selects a desired one of a black/red print mode 34, a black/blue print mode 35, and a black/yellow print mode 36 by clicking it with the mouse. It is now assumed that the user selects the black/red print mode 34, so that the black/red print mode 34 is validated (o is switched to Ø).

Returning to FIG. 2, the image forming unit 12 is a portion for receiving the print data from the image processing unit 11 and reproducing an image onto a print sheet 22 and comprises: the mechanical control unit 15; a black image drum 16; a yellow image drum 17; a magenta image drum 18; a cyan image drum 19; a fixing unit 20; and a belt unit 21.

The mechanical control units 15 (15-K, 15-Y, 15-M, 15-C) are arranged for the black image drum 16, the yellow image drum 17, the magenta image drum 18, and the cyan image drum 19 one by one. The mechanical control unit 15 is a portion for receiving a control signal from the control unit 13 and executing mechanical control of the image forming unit 12. The mechanical control units 15 are also portions having registers for distributing the print data sent from the image processing unit 11 to the black image drum 16, the yellow image drum 17, the magenta image drum 18, and the cyan image drum 19 on the basis of a predetermined rule, respectively.

Each of the black image drum 16, the yellow image drum 17, the magenta image drum 18, and the cyan image drum 19 has a detachable structure and is a portion for receiving the print data and reproducing an image onto the print sheet 22. The black image drum 16 reproduces the image by using toner of black (K). The yellow image drum 17 reproduces the image by using toner of yellow (Y). The magenta image drum 18 reproduces the image by using toner of magenta (M). The cyan image drum 19 reproduces the image by using toner of cyan (C).

The fixing unit 20 is a portion for fixing each color toner transferred to the print sheet 22 onto the print sheet 22.

The belt unit 21 is a portion for conveying the print sheet 22.

Figure 13:
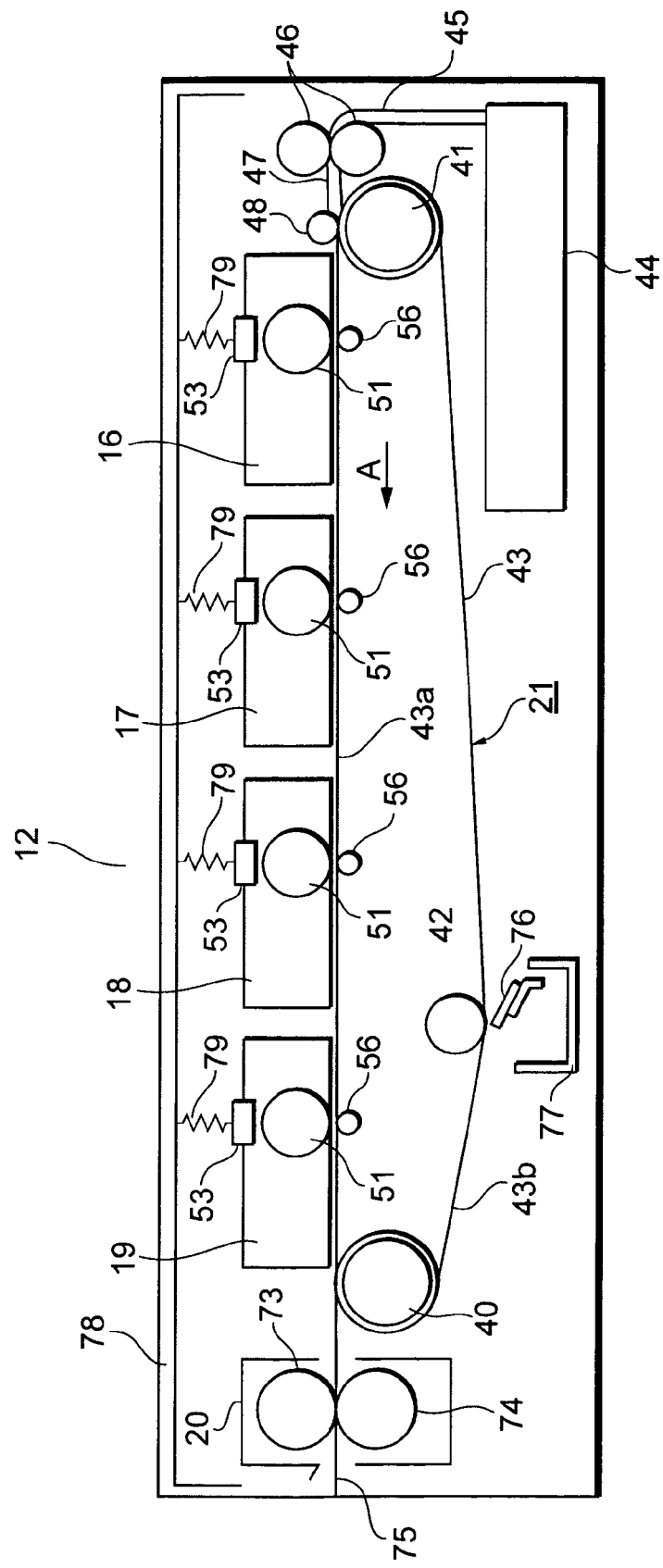
FIG. 13 is a cross sectional view showing a main portion of an image forming unit.

FIG. 13 is a cross sectional view showing a main portion of the image forming unit 12 in detail.

As mentioned above, the black image drum 16 which forms the black image, the yellow image drum 17 which forms the yellow image, the magenta image drum 18 which forms the magenta image, and the cyan image drum 19 which forms the cyan image are arranged in the image forming unit 12 in a tandem form in the conveying direction of the print sheet shown by an arrow (A) in the diagram.

Each of the black image drum 16, the yellow image drum 17, the magenta image drum 18, and the cyan image drum 19 is an image forming portion of an LED electrophotographic system and has: a photosensitive drum 51; an LED head 53 provided above a photosensitive material so as to face the photosensitive drum 51; and a transfer roller 56 provided under the photosensitive drum 51 so as to face it.

Bit map data of black, yellow, magenta, and cyan which has been developed by a developing portion (not shown) included in the control unit 13 shown in FIG. 2 is inputted to the LED heads 53 of the black image drum 16, the yellow image drum 17, the magenta image drum 18, and the cyan image drum 19, respectively.

An upper half portion 43a of an endless belt 43 which is wound around a driving roller 40, a driven roller 41, and a tension roller 42 in the belt unit 21 and runs is arranged so as to run freely between the photosensitive drum 51 and the transfer roller 56 of each of the black image drum 16, the yellow image drum 17, the magenta image drum 18, and the cyan image drum 19.

The tension roller 42 is urged downwardly by urging means (not shown). The endless belt 43 is tensioned so that its lower half portion 43b is urged by the urging means through the tension roller 42.

A paper feed portion 44 is provided on the right lower side of the image forming unit 12. The paper feed portion 44 supplies the print sheets enclosed on a print sheet cassette (not shown) one by one to resist rollers 46 through a conveying path 45. The print sheet supplied to the resist rollers 46 is conveyed to the endless belt 43 through a conveying path 47.

An adsorbing roller 48 which presses the driven roller 41 through the endless belt 43 so as to be come into pressure contact therewith is provided over the driven roller 41. The adsorbing roller 48 is made of, for example, a semiconductive rubber material having a high resistance and charges the print sheet conveyed through the conveying path 47, thereby allowing the print sheet to be adsorbed to the endless belt 43 by an electrostatic force.

A sensor (not shown) for detecting a front edge of the print sheet is provided for the conveying path 47.

The endless belt 43 is made of, for example, a semiconductive plastic film having a high resistance and its resistance value is set in such a manner that the print sheet is adsorbed by the electrostatic force and, when the print sheet is removed from the endless belt 43, the static electricity remaining on the endless belt 43 is naturally deelectrified.

The print sheet is adsorbed to the endless belt 43 and conveyed. The toner images of the respective colors are sequentially overlaid and transferred onto the print sheet by the black image drum 16, the yellow image drum 17, the magenta image drum 18, and the cyan image drum 19.

When the print sheet further reaches the driving roller 40, it is separated from the endless belt 43. A deelectrifier (not shown) is provided over the driving roller 40 so as to face the driving roller 40 through the endless belt 43.

The deelectrifier removes the charges from the print sheet and cancels the adsorbing state, thereby enabling the print sheet to be easily separated from the endless belt 43.

A sensor (not shown) for detecting a rear edge of the print sheet is provided on a downstream side in the print sheet conveying direction of the deelectrifier.

The print sheet separated from the endless belt 43 is conveyed to the fixing unit 20 having a heating roller 73 and a pressing roller 74, the toner images are fixed onto the print sheet, and the print sheet is ejected onto an ejecting stacker (not shown) through an ejecting path 75.

A cleaning blade 76 is provided under the tension roller 42 so as to face it. A front edge portion of the cleaning blade 76 is come into contact with the lower surface of the lower half portion 43b of the endless belt 43.

The cleaning blade 76 is made of, for example, a flexible rubber material or plastic material and scrapes off the toner remaining on the surface of the endless belt 43. The scraped toner is collected into a drain toner tank 77 provided under the cleaning blade 76.

Further, the black image drum 16, the yellow image drum 17, the magenta image drum 18, and the cyan image drum 19 will be described. However, since they have a similar construction, the yellow image drum 17 will be explained with reference to FIGS. 14, 15, and 16.

Figure 14:
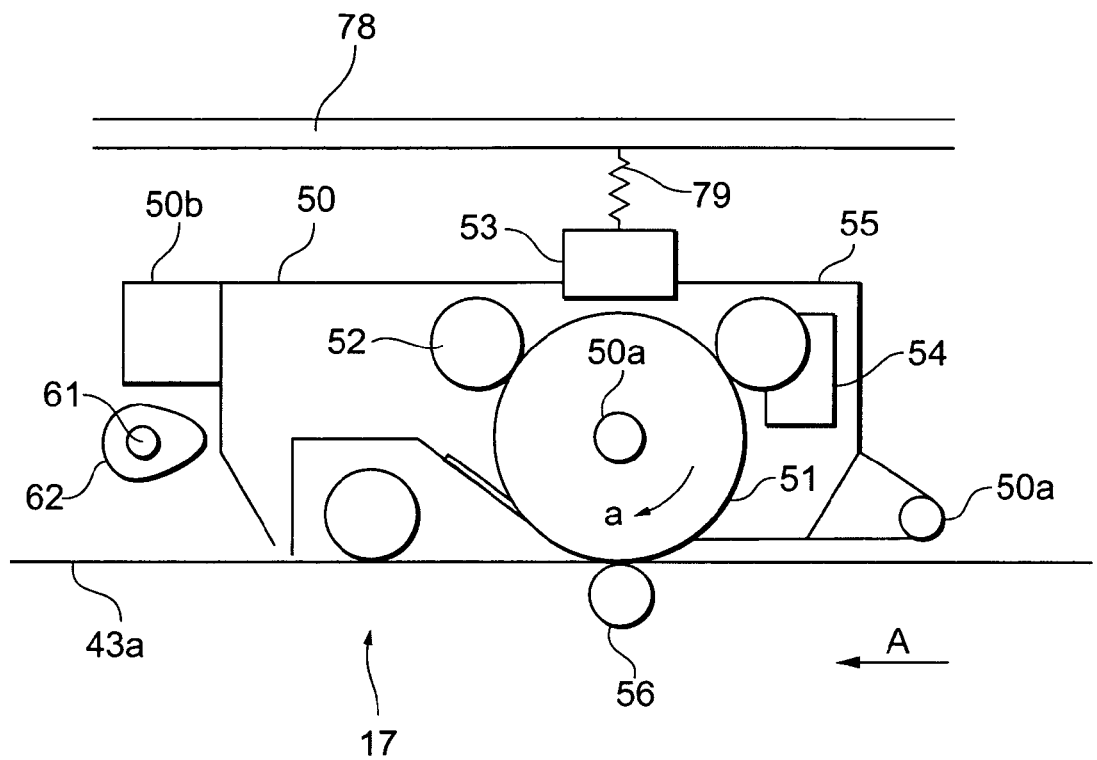
FIG. 14 is a cross sectional view showing a main portion of the image drum.
Figure 15:
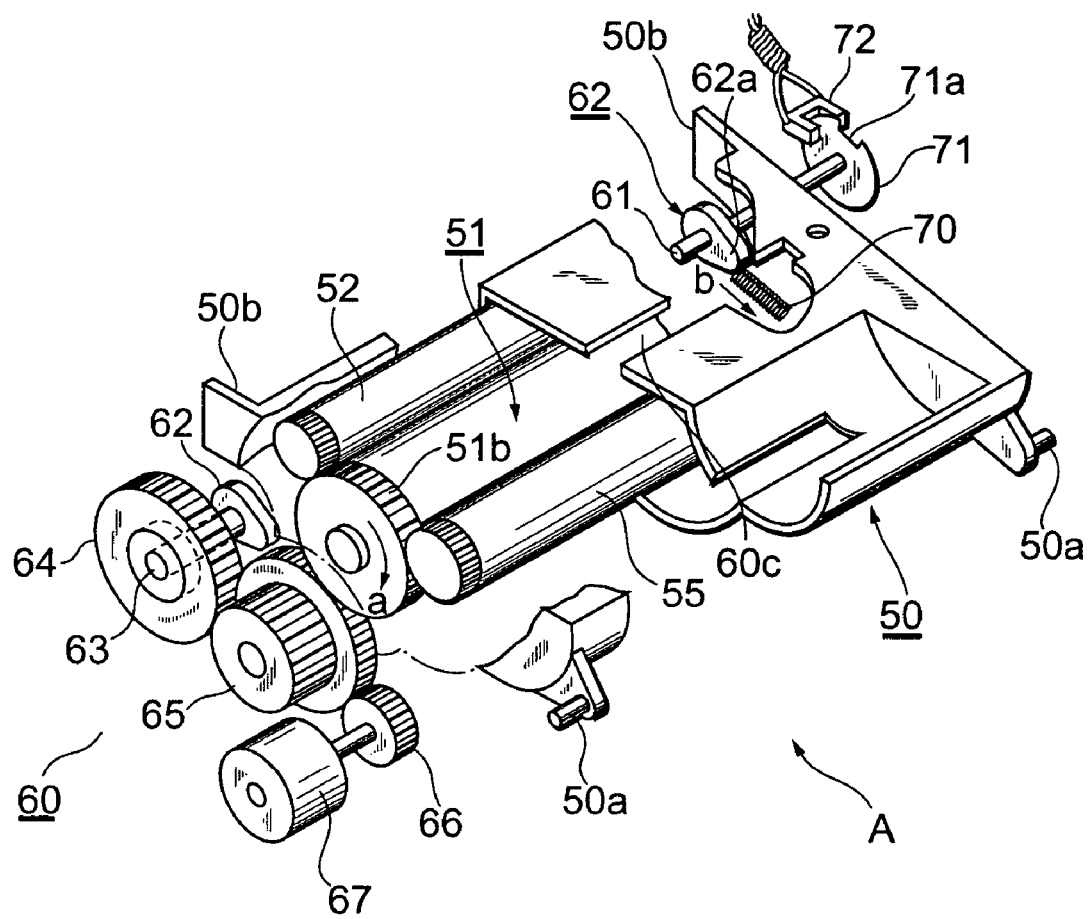
FIG. 15 is a perspective view showing a contact state of the image drum by a contact/removing mechanism.
Figure 16:
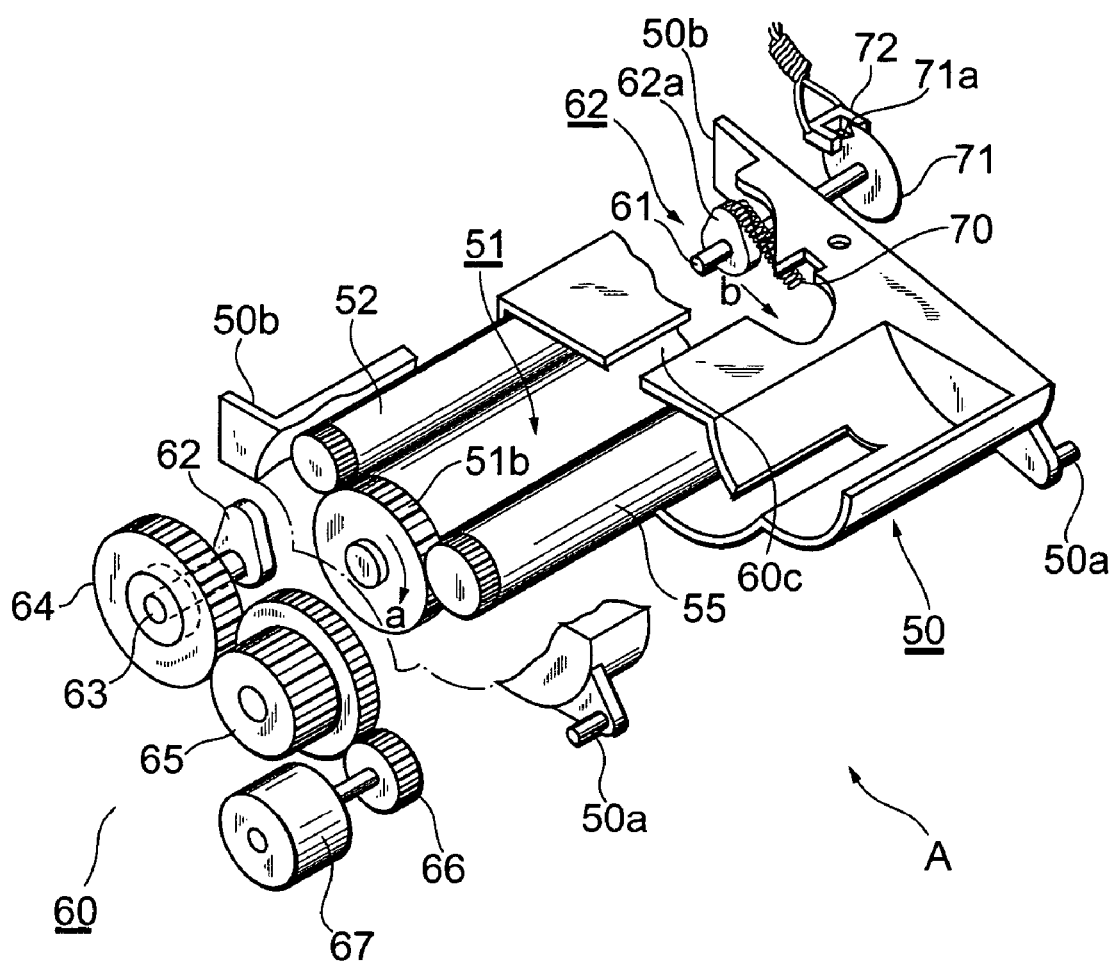
FIG. 16 is a perspective view showing a removing state of the image drum by the contact/removing mechanism.

FIG. 14 is a cross sectional view showing a main portion of the yellow image drum 17 shown in FIG. 13. FIGS. 15 and 16 are perspective views showing the main portion of the yellow image drum 17 shown in FIG. 13. As will be explained hereinafter, FIG. 15 is a diagram showing a contact state where the photosensitive drum 51 of the yellow image drum 17 is in contact with the endless belt 43 by a contact/removing mechanism 60. FIG. 16 is a diagram showing a removing state where the photosensitive drum 51 of the yellow image drum 17 is not come into contact with the endless belt 43 by the contact/removing mechanism 60.

As shown in FIG. 14, a charging roller 52, the LED head 53, a developing unit 54 having a developing roller 55, and the transfer roller 56 are arranged in processing step order around the photosensitive drum 51 which is rotated around an axis 51a as a rotational center in the direction of an arrow (a) shown in the diagram.

The photosensitive drum 51, the charging roller 52, and the developing unit 54 are supported to a frame 50. The LED head 53 is attached to an upper cover 78 of the image forming unit 12 main body through a spring 79, urged downward by the spring 79, is come into contact with the frame 50, and positioned.

The frame 50 is detachably attached to the image forming unit 12 main body and can be exchanged by opening the upper cover 78 and removing the LED head 53 from the frame 50.

The charging roller 52 uniformly charges the surface of the photosensitive drum 51.

The LED head 53 has an LED array (not shown) and selectively exposes the LED array in accordance with an inputted yellow image signal, thereby forming an electrostatic latent image onto the surface of the photosensitive drum 51.

The developing unit 54 has a toner tank (not shown) which contains the yellow toner, supplies the toner contained in the toner tank to the developing roller 55, and allows the toner to be deposited to the electrostatic latent image by the electrostatic force, thereby forming the yellow toner image.

The yellow toner image formed on the photosensitive drum 51 is transferred onto the print sheet by the transfer roller 56.

As shown in FIGS. 14 to 16, projections 50a are formed in edge portions on the upstream side of the frame 50 in the conveying direction A of the print sheet. The projections 50a are rotatably come into engagement with guide grooves (not shown) formed on the image forming unit 12 main body.

Projecting plates 50b are formed in edge portions on the downstream side of the frame 50 in the conveying direction A of the print sheet.

On the downstream side of the frame 50 in the conveying direction A of the print sheet, a cam shaft 61 is rotatably supported to the image forming unit 12 main body. Eccentric cams 62 are fixed near both ends of the cam shaft 61 so as to face the projecting plates 50b.

The frame 50 is urged downward by the spring 79 through the LED heads 53. When the cam shaft 61 is rotated, the eccentric cams 62 push the projecting plates 50b upward while rotating, thereby allowing the frame 50 to be rotated clockwise around the projections 50a as a fulcrum by an eccentric amount of the eccentric cams 62.

A gear 64 is arranged to the cam shaft 61 through a one-way bearing 63. The gear 64 is come into engagement with a motor gear 66 fixed to a rotary shaft of a motor 67 through a double gear 65.

The cam shaft 61, eccentric cams 62, one-way bearing 63, gear 64, double gear 65, motor gear 66, and motor 67 construct the contact/removing mechanism 60.

The contact/removing mechanism 60 moves the frame 50 upward or downward, thereby allowing the photosensitive drum 51 to be come into contact with or removed from the endless belt 43.

As shown in FIG. 15, when the frame 50 is in the contact state, the double gear 65 is come into engagement with a gear 51b of the photosensitive drum 51. When the motor 67 is rotated at a constant speed clockwise in the diagram, the photosensitive drum 51 is rotated at a constant speed in the direction shown by an arrow (a) in the diagram. Although the gear 64 is also rotated at this time, since the one-way bearing 63 races, the cam shaft 61 and the eccentric cams 62 are not rotated.

A spring 70 is provided between an eccentric portion 62a of the eccentric cam 62 and the print unit 12 main body. The eccentric cam 62 is urged by the spring 70 so that the eccentric portion 62a is directed in the direction of an arrow (b) in FIG. 16.

As shown in FIG. 16, the motor 67 is rotated in the reverse direction in order to set the frame 50 into the removal state. At this time, the one-way bearing 63 is locked and the cam shaft 61 and the eccentric cam 62 are rotated against the urging force of the spring 70. Therefore, the frame 50 is rotated clockwise in the diagram around the projections 50a as a fulcrum, so that the engagement between the double gear 65 and the axis 51a of the photosensitive drum 51 is disengaged.

A slit disk 71 formed with a slit 71a is fixed to the cam shaft 61. The slit 71a is detected by a photosensor 72 and a rotational angle of the eccentric cam 62 is detected.

A window hole 50c for positioning the LED head 53 so as to face the photosensitive drum 51 is formed in the frame 50.

The operation of the contact/removing mechanism 60 is controlled by, for example, a driving color selecting portion (not shown) included in the control unit 13 shown in FIG. 2. When a power source of the color printer is OFF, the contact/removing mechanism 60 is in the contact state. When the power source of the color printer is turned on, initial setting of the control unit 13 is performed. The driving color selecting portion rotates the motor 67 of each of the image drums 16 to 19 in the reverse direction, thereby setting the contact/removing mechanism 60 into the removal state.

The driving color selecting portion rotates the motor 67 of each image drum in the forward direction as necessary, thereby setting the contact/removing mechanism 60 into the contact state with reference to, for example, a driving color storing unit (not shown) in a color plane detecting portion (not shown) included in the control unit 13.

The photosensitive drum 51, charging roller 52, LED head 53, developing unit 54, transfer roller 56, and the like of each of the image drums 16 to 19 can be driven only when the contact/removing mechanism 60 is set into the contact state by the driving color selecting portion.

The operation of the color printer having the structure as mentioned above will now be described.

First, the initial setting operation of the color printer will be described.

When the power source of the color printer is turned on, each initial setting is performed by the control unit 13.

In the fixing unit 20, a heater in the heating roller 73 is energized and a temperature of the heating roller 73 is set into a predetermined range.

The foregoing driving color selecting portion rotates the motor 67 of each of the image drums 16 to 19 in the reverse direction. The one-way bearing 63 is locked and the cam shaft 61 and the eccentric cam 62 are rotated against the urging force of the spring 70. The frame 50 is rotated clockwise in the diagram around the projections 50a as a fulcrum, so that the engagement between the double gear 65 and the axis 51a of the photosensitive drum 51 is disengaged. Thus, the photosensitive drum 51 is removed from the endless belt 43.

When the eccentric portion 62a of the eccentric cam 62 is rotated upward and the frame 50 reaches the removal position, the slit 71a of the slit disk 71 is detected by the photosensor 72. The motor 67 is stopped. The eccentric cam 62 is not returned to the original position by the urging force of the spring 70 but the frame 50 is held in the removal position.

The foregoing driving color selecting portion individually sets the contact/removing mechanism 60 of each of the image drums 16 to 19 into the contact state as necessary with reference to the driving color storing unit of the color plane detecting portion.

The driving color selecting portion rotates the corresponding motor 67 in the image forming unit in the forward direction. At this time, although the rotation of the motor 67 is transferred to the gear 64 through the motor gear 66, double gear 65, and gear 51b, since the one-way bearing 63 races, the rotation of the motor 67 is not transferred to the cam shaft 61 and the eccentric cam 62.

Therefore, the eccentric portion 62a of the eccentric cam 62 is urged by the spring 70. The cam shaft 61 rotates the cam shaft 61 and the eccentric cam 62 in such a direction as to lock the one-way bearing 63 and stops them at a position where the eccentric portion 62a faces in the direction of the arrow (b).

At the same time, the frame 50 is rotated counterclockwise around the projections 50a as a fulcrum by the urging force of the spring 70. The photosensitive drum 51 is come into pressure contact with the endless belt 43, so that the gear 51b of the photosensitive drum 51 is come into engagement with the double gear 65. The motor 67 is stopped at the position where the frame 50 collides with a stopper (not shown) of the print unit 12 main body. Thus, the image forming unit enters the operative mode.

As mentioned above, in the color printer, the photosensitive drum 51 of each of the image drums 16 to 19 of the image forming unit 12 is come into contact with or removed from the endless belt 43 by each contact/removing mechanism 60. The image forming unit (11 to 14) can be controlled so as to be set into the operative/inoperative mode.

Therefore, since the photosensitive drums 51 of the image forming units corresponding to the colors which are unnecessary for printing can be removed from the endless belt 43, the mechanical deterioration due to the abrasion between the photosensitive drum 51 and the endless belt 43 can be reduced. Thus, the lives of the photosensitive drum 51 and the endless belt 43 can be prolonged.

Since the image forming units corresponding to the colors which are unnecessary for printing can be set to the inoperative mode, the deterioration in toner due to the mechanical factors can be suppressed. Thus, the live of the toner can be prolonged and the preferable print quality can be maintained for a long time.

Although the color printer to which the image forming method of the invention is applied has been described above, the image forming method of the invention will now be described with reference to FIG. 1 again.

From FIG. 1, according to the image forming method of the embodiment, when the power source of the color printer is turned on by the user, the image is reproduced onto the print sheet through the following four steps S1 to S4. First, an outline of all processing steps will be explained with reference to this diagram. After that, details of each main step will be explained with reference to other diagrams.

Step S1:
Warming-up processing step. In this step, preparing processes such as operation for raising the temperature of the fixing unit 20 (FIG. 2) to a certain temperature, correction of print concentration, detection of the presence or absence of the image drum, and the like until the printer enters the operative mode are executed.

Step S2:
Receiving processing step in which the image processing unit 11 (FIG. 2) receives the image information from the upper apparatus 23 (FIG. 2) and stores it into a built-in reception buffer (not shown). In this step, the color pair selecting step of allowing the user to select a reproduction color pair which is used for the 2-color printing from a plurality of color pairs that have previously been selected is executed.

Step S3:
Development processing step in which the control unit 13 (FIG. 2) converts the image information stored in the reception buffer into the print data, separates it into the different kinds of data (image data, character data, and figure data), executes predetermined color conversion to each data, and stores the converted data into a built-in page buffer (not shown). In this step, the following steps are executed: a print data separating step of separating the print data every different kind of data included in the print data; and a print data developing step of color converting one of the different kinds of data by using one of the reproduction color pair and developing it and color converting the remaining ones of the different kinds of data by using the other one of the reproduction color pair and developing them.

Step S4:
Print processing step in which each mechanical control unit 15 (FIG. 2) drives each image drum, the fixing unit 20, the belt unit 21, and the like under the control of the control unit 13 (FIG. 2) and reproduces an image onto the print sheet 22 (FIG. 2). In this step, an image drum up/down step of selecting the image drums having the colors other than the reproduction color pair and holding them in the inoperative mode is executed.

The explanation of the outline of each processing step is finished here. Details of each main step will now be described.

Figure 5:
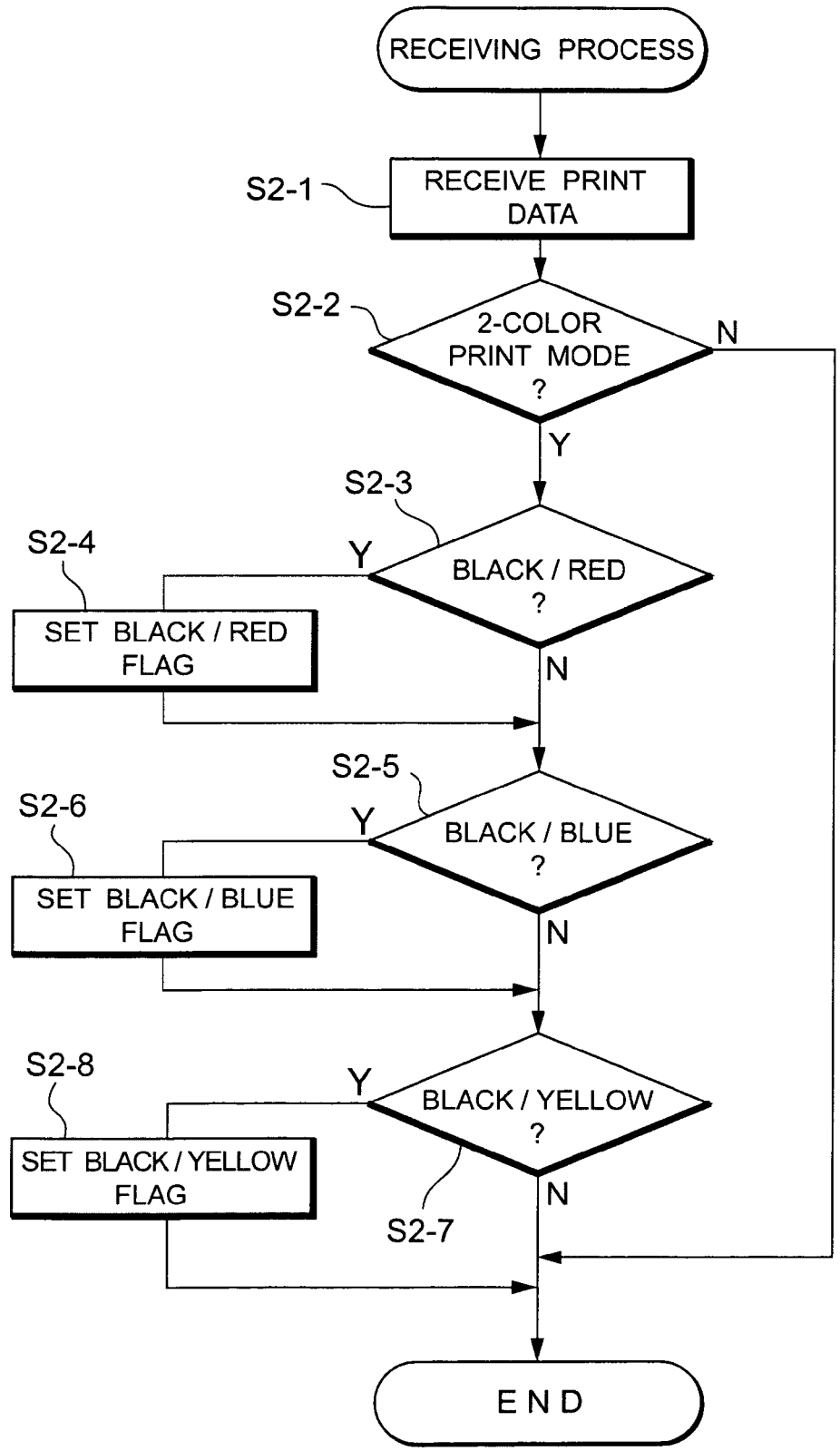
FIG. 5 is a flowchart for a receiving process in the embodiment.

FIG. 5 is a flowchart for the receiving process in the embodiment.

Details of the receiving process (step S2 in FIG. 1) will be described hereinbelow in accordance with steps S2-1 to S2-8.

Step S2-1:
The image processing unit 11 (FIG. 2) receives the image information from the upper apparatus 23 (FIG. 2) and stores it into the built-in reception buffer (not shown).

Step S2-2:
The control unit 13 (FIG. 2) discriminates whether or not the 2-color print mode 33 (FIG. 4) described with reference to FIG. 4 has been clicked from the display unit 14 (FIG. 2). If the 2-color print mode 33 (FIG. 4) has been clicked, step S2-3 follows. If the 2-color print mode 33 (FIG. 4) is not clicked, the processing routine is finished. It is now assumed that the black/red print mode 34 (FIG. 4) in the 2-color print mode 33 has been clicked.

Step S2-3:
If the black/red print mode 34 (FIG. 4) has been clicked, step S2-4 follows. In the other cases, step S2-5 follows. Since the black/red print mode 34 (FIG. 4) has been clicked here, step S2-4 follows.

Step S2-4:
The control unit 13 (FIG. 2) sets a flag of the black/red print mode into a predetermined flag area.

The processing routine is finished after steps S2-5 and S2-7. In this state, only the flag of the black/red print mode is set into the predetermined flag area. Other flags, that is, a flag of the black/blue print mode and a flag of the black/yellow print mode are held in the set state and the processing routine is finished.

As described above, the black/red pair is selected as a reproduction color pair which is used in the 2-color printing from the color pairs (black/red, black/blue, and black/yellow) which have previously been selected and the color pair selecting step is executed.

Although only the case where the black/red print mode has been selected (the above presumption) has been described here, if another mode is selected, the processing routine is finished after steps S2-5 to S2-6 or steps S2-7 to S2-8 corresponding to each selected mode.

Figure 6:
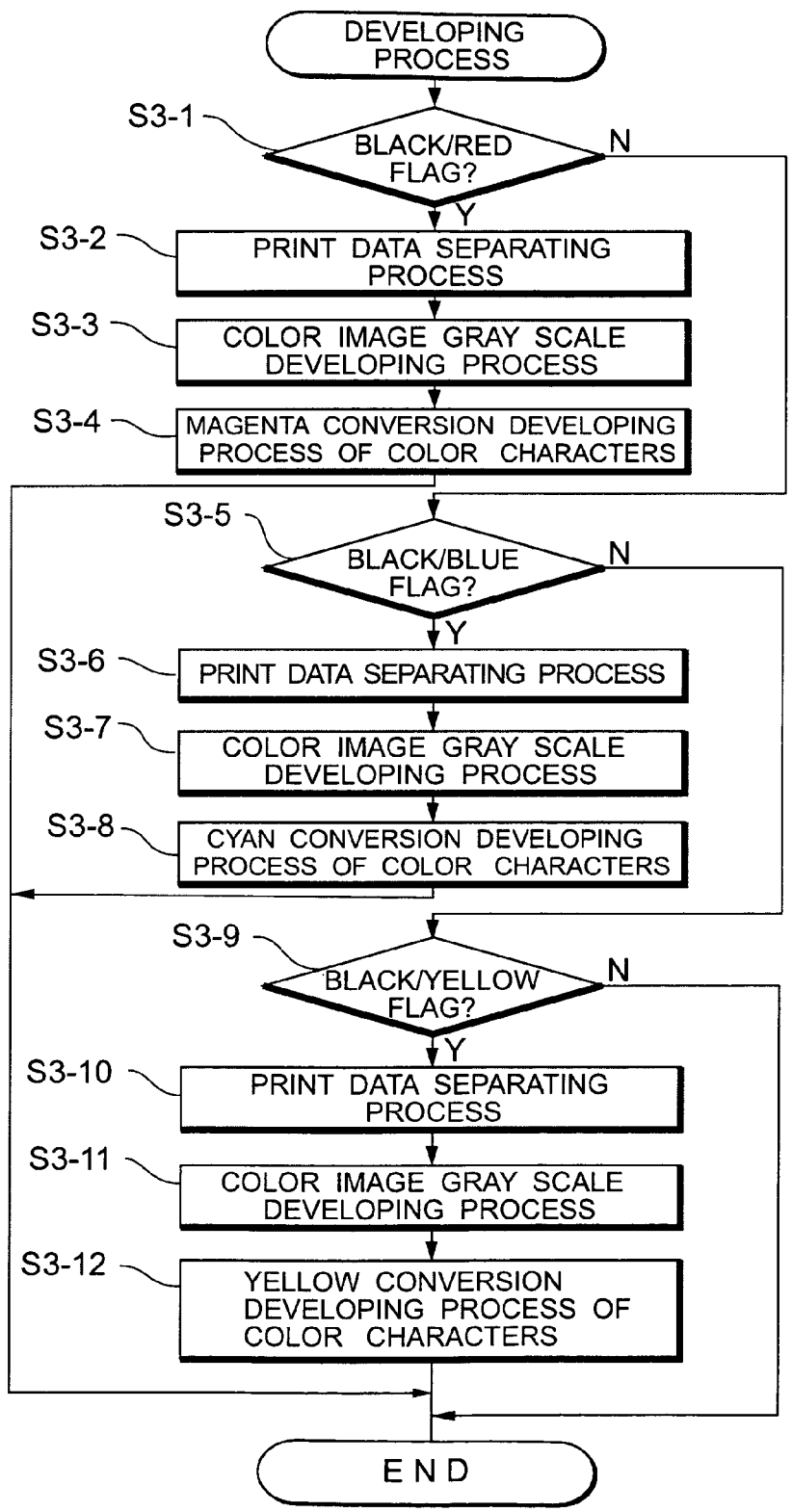
FIG. 6 is a flowchart for a developing process in the embodiment.

FIG. 6 is a flowchart for the developing process in the embodiment.

Details of the developing process (step S3 in FIG. 1) will be described hereinbelow in accordance with steps S3-1 to S3-12.

Step S3-1:

The control unit 13 (FIG. 2) detects the flag of the set mode as executing the developing process. Since the flag of the black/red print mode has been set to the high level here, step S3-2 follows.

Step S3-2:

The control unit 13 (FIG. 2) executes the print data separating process. Details of the print data separating process will now be described with reference to other diagrams.

FIG. 7 is an explanatory diagram of kinds of data.

FIG. 8 is an explanatory diagram of the separation of the data.

As shown in FIG. 7, character data (a), figure data (b), and image data (c) are included in the print data.

The character data (a) is constructed by a character code, color information, a size of character, a character style, other attribute information, and the like.

The figure data (b) is constructed by vector data, color information, a thickness of line, paint information, other attribute information, and the like.

The image data (c) holds the attribute information of the whole image data every color such as cyan (c), magenta (m), yellow (y), black (k), or the like.

In the print data separation processing step, the control unit 13 (FIG. 2) separates the print data into the image data and the data other than the image data. This function is shown in FIG. 8. In the diagram, (a) denotes an image printed by using all of the received data. That is, this image is formed on the basis of image data 31, figure data 38, and character data 39.

(b) denotes an image obtained on the basis of only the image data 31 separated from all of the received data. That is, a white-on-black portion 32 obtained by extracting the character data from the image data is also included in this image.

(c) denotes an image obtained on the basis of the data (other than the image data) separated from all of the received data. That is, this image is formed on the basis of the figure data 38, the character data 39, and the like.

Returning to FIG. 6 again, the explanation about the details of the developing process (step S3 in FIG. 1) will be continued.

Step S3-3:

The control unit 13 develops the color image data 31 into a gray scale and stores it into the page buffer (not shown). The gray scale denotes a state where the saturation is excluded from the image data and the image data is expressed only by dark and bright of black and white.

Step S3-4:

The control unit 13 converts the data (other than the image data) into magenta data, stores it into the page buffer (not shown), and finishes the processing routine.

Although only the case where the flag of the black/red print mode has been set has been described here, if another flag has been set, the processing routine is finished after steps S3-5 to S3-8 or steps S3-9 to S3-12 corresponding to another flag.

As described above, since the print data is separated into the image data and the other data and they are individually developed, the print data separating step and the print data developing step are executed, respectively.

Figure 9:
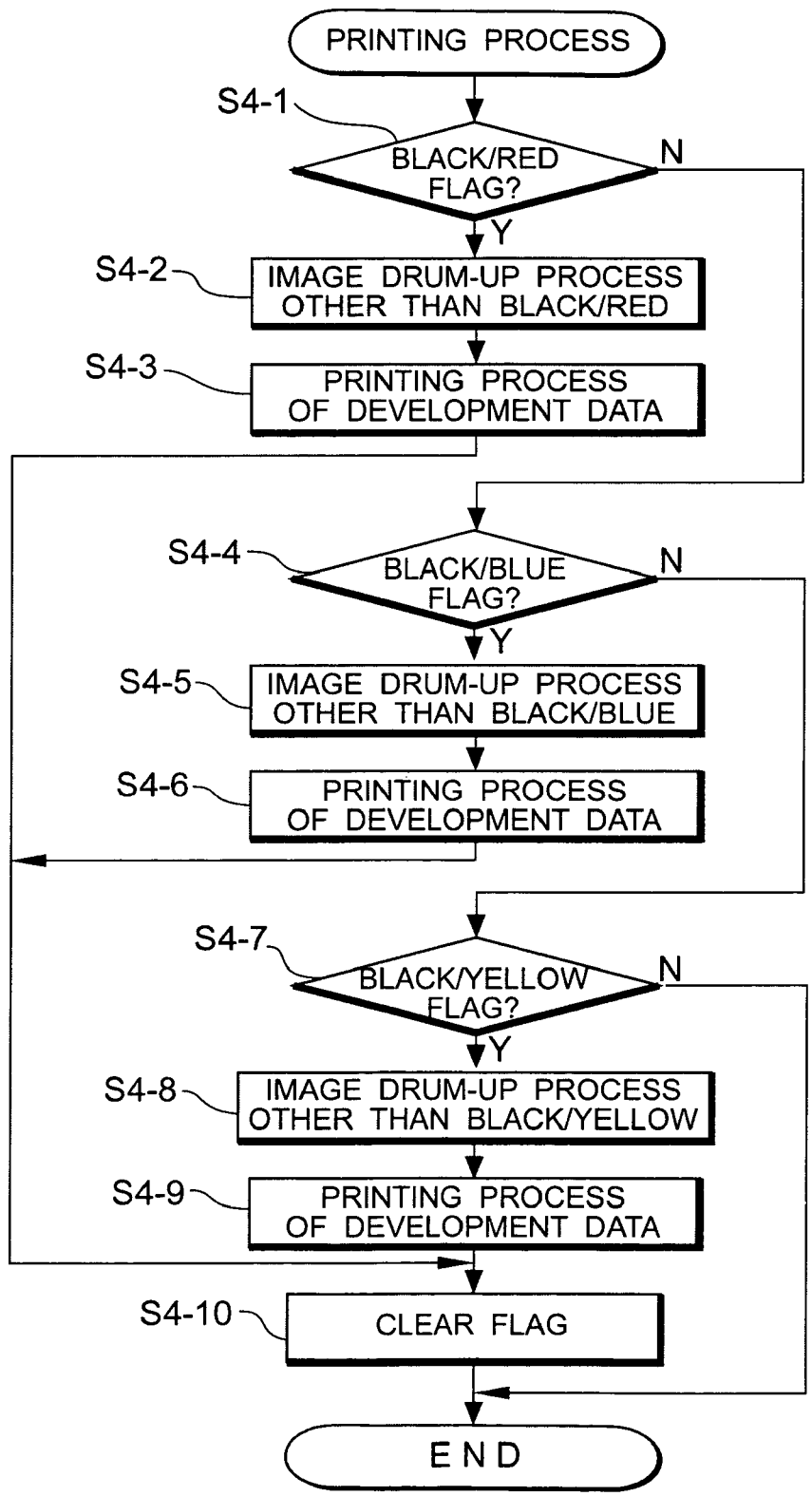
FIG. 9 is a flowchart for a printing process in the embodiment.

FIG. 9 is a flowchart for the printing process in the embodiment.

Details of the printing process (step S4 in FIG. 1) will now be described hereinbelow with reference to steps S4-1 to S4-10.

Step S4-1:

The control unit 13 (FIG. 2) detects the flag of the mode set as executing the developing process. Since the flag of the black/red print mode has been set here, step S4-2 follows.

Step S4-2:

The control unit 13 (FIG. 2) controls the mechanical control units 15 (FIG. 2) so as to move the image drums of the colors other than black and magenta to an upper portion away from the print sheet 22 (FIG. 2) and hold them in the inoperative mode. This process is executed to prevent the image drums which are not used from being polluted by the toner or to prevent the lives of the image drums from being shortened in spite of the fact that they are not actually used by setting those drums into the inoperative mode.

Step S4-3:

The control unit 13 (FIG. 2) sends the print data to the image forming unit 12 (FIG. 2) and starts the printing process.

Step S4-10:

The flag is cleared and the printing process is finished.

Although only the case where the flag of the black/red print mode has been set has been described here, if another flag has been set, the processing routine is finished after steps S4-4 to S4-6 or steps S4-7 to S4-9 corresponding to another flag.

As described above, since the image drums other than the image drums used in the black/red print mode which is actually reproduced are held in the inoperative mode, the image drum up/down step is executed. This state will now be described with reference to the drawings.

Figure 10A:
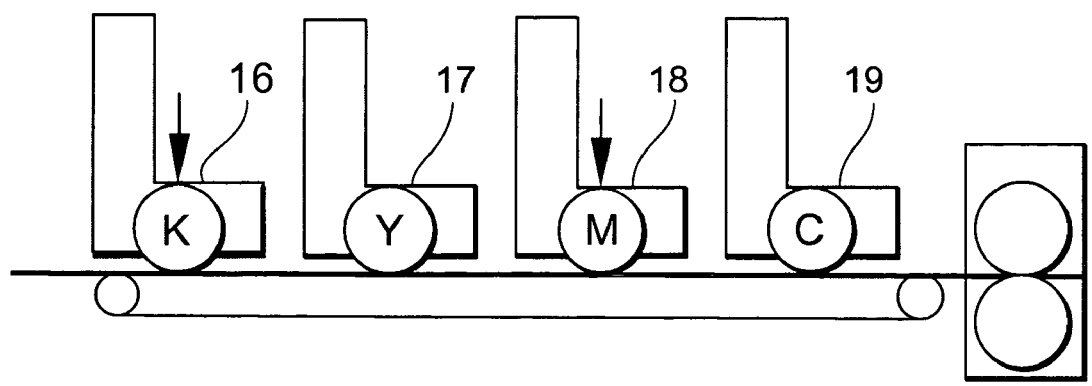
FIGS. 10A and 10B are explanatory diagrams of an image drum up/down step.
Figure 10B:
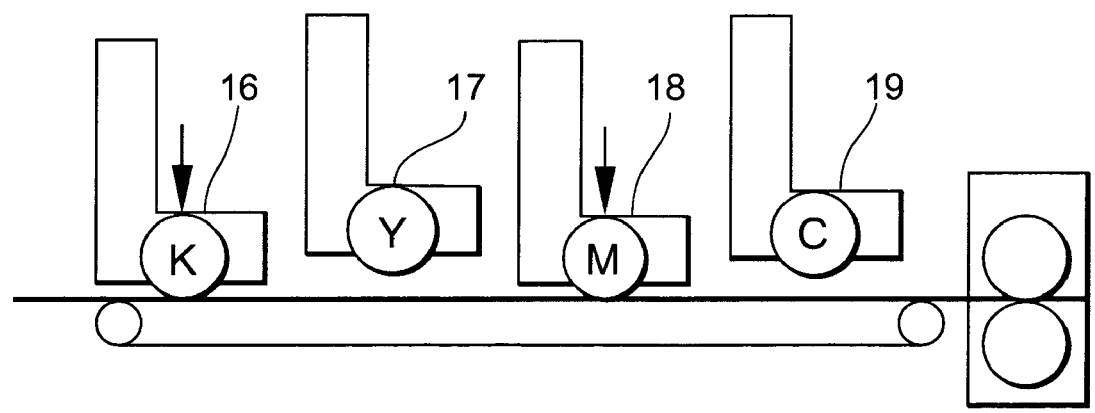

FIGS. 10A and 10B are explanatory diagrams of the image drum up/down step.

FIG. 10A shows a state before execution of the image drum up/down step. FIG. 10B shows a state after the execution of the image drum up/down step. It will be understood from FIG. 10B that the image drums in the inoperative mode are moved to the portions over the print sheet 22 (FIG. 2) in the moving direction and are in the inoperative mode.

A partial modification of the embodiment described above will now be explained.

In the above embodiment, it is presumed that the predetermined image drums have been attached in the predetermined positions of the image forming apparatus. However, in such a construction, a case where only the 2-color printing cannot be executed for a long time occurs. To solve such a problem, the control method is partially changed as follows.

As partially changing the control method, a part of the guide display screen of the display unit 14 (FIG. 2) and a part of the structure of the image drums are changed as follows.

Figure 11:
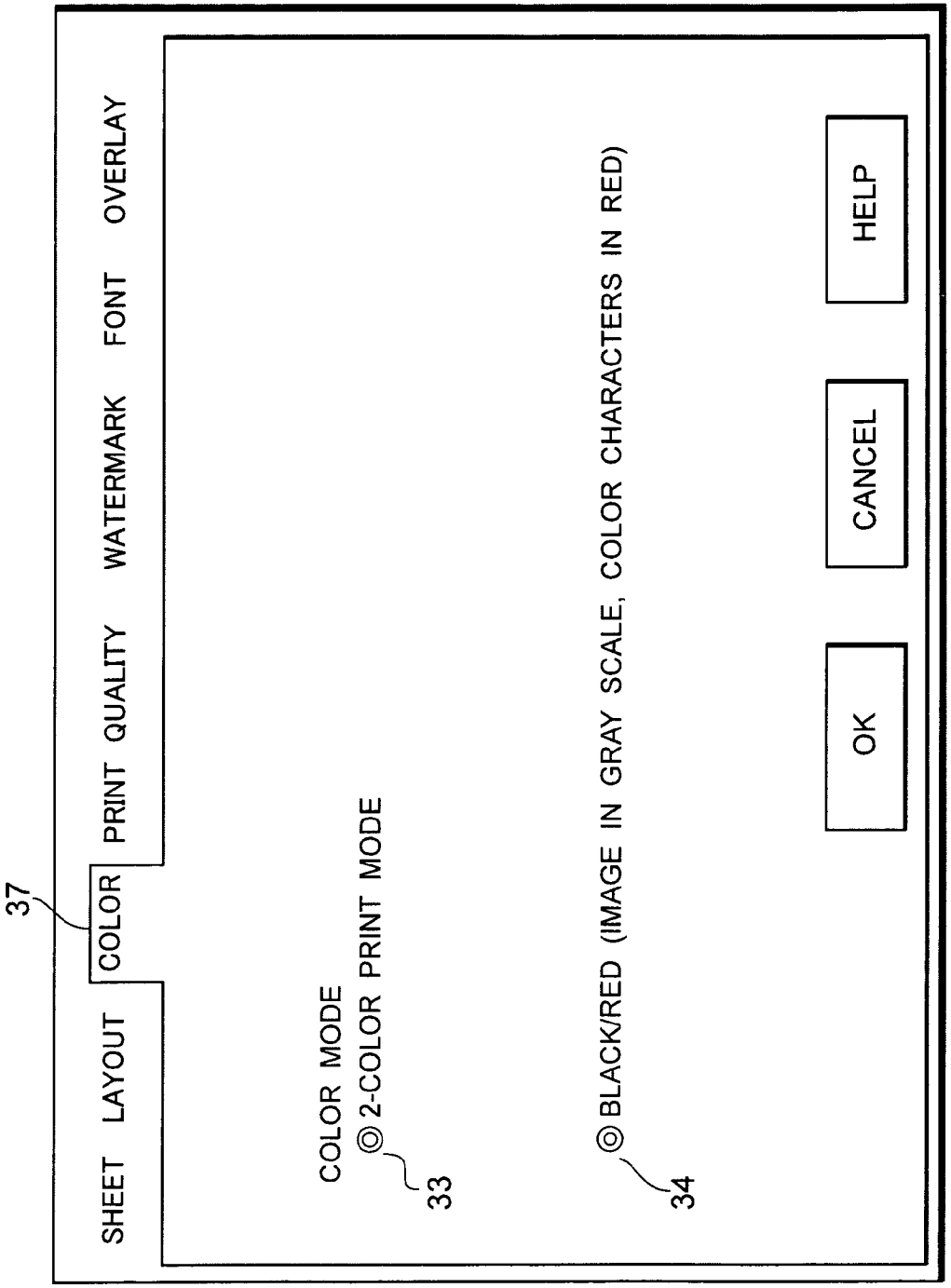
FIG. 11 is an explanatory diagram (part 3) of the guide display screen.

FIG. 11 is an explanatory diagram (part 3) of the guide display screen.

When the user clicks a desired one of the items such as sheet, layout, color, print quality, watermark, font, and overlay displayed in a top portion of the diagram by using a mouse, the display screen is shifted to detailed setting of the selected item. Only the case where the color 37 which is directly concerned with the invention is clicked with the mouse will now be described. When the color is selected, the 2-color print mode 33 is displayed in the item of the color mode. Only the black/red print mode 34 is displayed as details of the 2-color print mode under the color mode and the 2-color print mode 33 and the black/red print mode 34 are automatically validated (o is switched to Ø). With respect to the black/red print mode 34, the invention is not always limited to this mode but the color mode can be also set to another mode.

Subsequently, the structure of the image drum is changed as follows (an example).

A peculiar construction is provided for every drum for a part of the black image drum 16, the yellow image drum 17, the magenta image drum 18, and the cyan image drum 19 or a part of the each cassette including the drum so that the color information showing each color can be obtained when the image drums are attached to the image forming unit 12 (FIG. 2) main body. For example, a portion to be come into contact with is provided in a peculiar position of each drum and a plurality of electrical contacts are provided in the drum attaching positions in the image forming unit so that their positions are deviated. The attached image drum can be discriminated by a method whereby from which one of the electrical contacts an attaching signal has been derived is detected by the mechanical control unit 15 every attaching signal. Since other constructing portions are substantially similar to those in the embodiment, their description is omitted here.

The partial modification of the control method will now be described.

In the explanation of the embodiment, the warming-up processing step itself is executed, that is, only the preparing processes such as operation for raising the temperature of the fixing unit 20 (FIG. 2) to a certain temperature, correction of print concentration, detection of the presence or absence of the image drum, and the like until the printer enters the operative mode are executed. According to the control method of the modification, a color information obtaining step and a data distribution setting step are newly executed in addition to the warming-up process.

Figure 12:
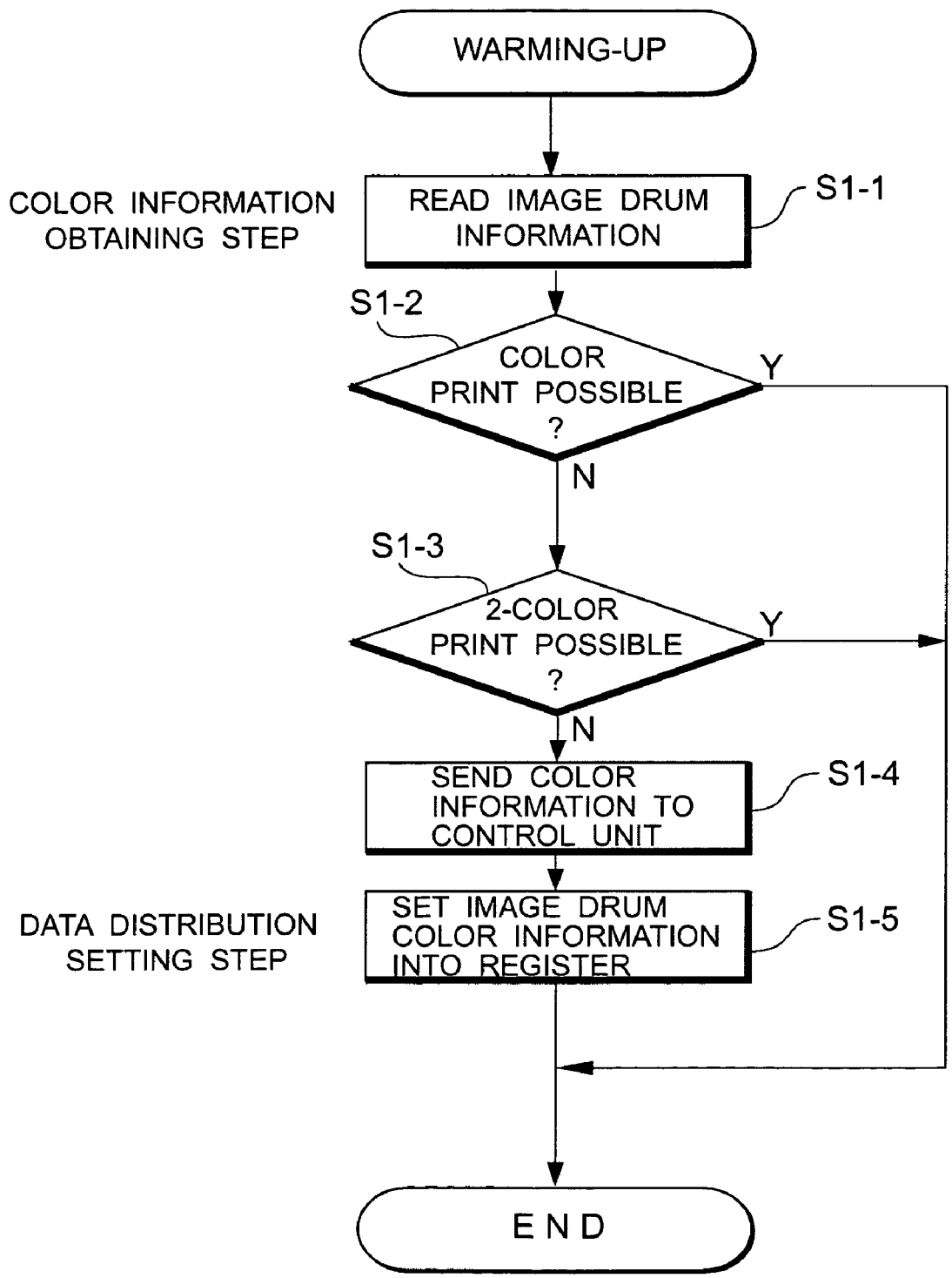
FIG. 12 is a partially added flowchart for a warming-up process.

FIG. 12 is a partially added flowchart for the warming-up process.

Details of this process will be described hereinbelow in accordance with steps Si-1 to S1-4.

Step S1-1:

Each mechanical control unit 15 (FIG. 2) obtains the color information from the attached image drum. This portion corresponds to the color information obtaining step.

Step S1-2:

If all of the image drums have been attached in the attaching positions, each mechanical control unit 15 (FIG. 2) determines that the color printing is possible and finishes the processing routine. If a part of the image drums are not attached, step S1-3 follows.

Step S1-3:

If the two image drums necessary for the 2-color printing, for example, the black image drum 16 (FIG. 2) and the magenta image drum 18 (FIG. 2) have been attached in the predetermined positions, each mechanical control unit 15 (FIG. 2) determines that the 2-color printing is possible and finishes the processing routine. It is assumed here that although the black image drum 16 (FIG. 2) and the magenta image drum 18 (FIG. 2) have been attached, they have been attached in the positions other than the predetermined positions.

Step S1-4:

The mechanical control unit 15 (FIG. 2) sends the color information to the control unit 13 (FIG. 2).

Step S1-5:

The control unit 13 (FIG. 2) controls the mechanical control unit 15 (FIG. 2) so as to set the register so that predetermined print data is distributed to the predetermined image drums on the basis of the color information and finishes the processing routine. This portion corresponds to the data distribution setting step.

The case where the received print data is separated into three kinds of data such as image data, character data, and figure data, the image data is expressed by one of the color pair, and the character data and the figure data, for example, are expressed by the other one of the color pair has been described above. However, the invention is not limited to such an example. That is, it is also possible to construct the apparatus in such a manner that, from the received data, an image comprising only the image data (image only in one-printing form) and an image comprising the character data and the figure data (image in two-printing form) are discriminated and the image only in the one-printing form is monochromatically printed. The image in the two-printing form is printed in two colors.

Although the embodiment has been described by limiting the case where the image forming apparatus has directly received the print data from the upper apparatus, the invention is not limited to this example but the print data can be also transmitted from the upper apparatus to the image forming apparatus via the network.

The present invention is not limited to the foregoing embodiment but many modifications and variations are possible within the spirit and scope of the appended claims of the invention.

What is claimed is:

1. An image forming apparatus which receives image information and converts the image information into print data, the print data including image data and non-image data, the apparatus comprising:

plural image drums, each of which being arranged at a predetermined position, and each drum corresponding to a different color, an image processing unit which provides a user with the capability for selecting a 2-color print mode, so as to determine a first color for the image data and a second color different than the first color for the non-image data;

a display unit which displays a 2-color print mode selection scene that contains plural paired selections of the first color and the second color;

a separating section which separates the print data into the image data and the non-image data, the image data including a white-on-black portion and the non-image data including character data and figure data; and a color converting section which converts the image data into the first color and converts the non-image data into the second color;

wherein, upon selecting the 2-color mode, the image data is printed only by one of the plurality of image drums that corresponds to the first color and the non-image data is printed only by one of the plurality of image drums corresponding to the second color, and each one of the image drums which correspond to neither the first nor the second colors is moved from its predetermined position;

wherein selection of one of the plural paired selections by the user simultaneously determines both the first color and the second color, and wherein, where a portion of the character data overlaps an area of image data, the separating section creates the white-on-black portion by extracting the overlapping character data from the image data, and the color converting section converts the created white-on-black portion into the first color and converts the character data including the extracted character data into the second color such that the extracted character data in the second color surrounded by the white-on-black image converted to the first color are formed on the printed sheet.

2. The image forming apparatus according to claim 1, wherein the first color is black, and image data is converted into a gray scale.

3. The image forming apparatus according to claim 1, further comprising:

a color information obtaining section which obtains the color corresponding to each of the plurality of image drums; and a data distribution setting section which distributes said print data in the different forms to the corresponding drum on the basis of said color information.

4. The image forming apparatus according to claim 1, further comprises:

an image data discriminating unit which discriminates image data from said received print data; and a first image forming unit which forms an image of a single color from said image data discriminated by said image data discriminating unit.

5. The image forming apparatus according to claim 1, further comprising:

a character data discriminating unit which discriminates character data from said received print data; and a second image forming unit which forms a character image of one of two colors from said character data discriminated by said character data discriminating unit.

6. The image forming apparatus according to claim 1, further comprising:

a figure data discriminating unit which discriminates figure data in said second printing form from said received print data; and a third image forming unit which forms a figure image of one of two colors from said figure data discriminated by said figure data discriminating unit.

7. The apparatus of claim 1, wherein said non-image data is character data.

8. The apparatus of claim 1, wherein the non-image data is character data and figure data.

9. The apparatus of claim 1, wherein the first color is black and the second color is one of cyan, magenta and yellow.

10. The apparatus of claim 9, wherein the non-image data further contains black designation data that is designated to use the first color, the black designation data is printed only by the image drum that corresponds to the first color.

11. The apparatus of claim 10, wherein the non-image data includes character data and figure data, the black designation data is composed of black designation character data and black designation figure data that are designated to use the first color.

* * * * *